US007922166B2

(12) United States Patent
Sakakibara et al.

(10) Patent No.: US 7,922,166 B2
(45) Date of Patent: Apr. 12, 2011

(54) IMAGE READER

(75) Inventors: Akihiro Sakakibara, Toyota (JP); Takashi Ohama, Iwakura (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 775 days.

(21) Appl. No.: 11/521,507

(22) Filed: Sep. 15, 2006

(65) Prior Publication Data

US 2007/0063430 A1 Mar. 22, 2007

(30) Foreign Application Priority Data

Sep. 16, 2005 (JP) ................................ 2005-270259

(51) Int. Cl.

| | |
|---|---|
| ***B65H 5/22*** | (2006.01) |
| ***B65H 83/00*** | (2006.01) |
| ***B65H 85/00*** | (2006.01) |
| ***H04N 1/04*** | (2006.01) |

(52) U.S. Cl. ....................... 271/3.01; 271/4.01; 358/498

(58) Field of Classification Search ................. 271/3.14, 271/4.01, 171; 358/498; 355/47, 48; 399/215, 399/367, 370; 348/498

See application file for complete search history.

(56) References Cited

U.S. PATENT DOCUMENTS

| | | | | |
|---|---|---|---|---|
| 5,680,203 | A * | 10/1997 | Kobayashi et al. | 355/76 |
| 5,844,698 | A * | 12/1998 | Fu et al. | 358/488 |
| 5,953,574 | A | 9/1999 | Okada | |
| 7,346,206 | B2 * | 3/2008 | Hill et al. | 382/141 |
| 7,511,862 | B2 * | 3/2009 | Sano et al. | 358/474 |
| 7,604,228 | B2 * | 10/2009 | Ohama et al. | 271/3.14 |
| 2003/0184007 | A1 * | 10/2003 | Furukawa | 271/171 |
| 2004/0207887 | A1 * | 10/2004 | Makino et al. | 358/496 |
| 2006/0071386 | A1 * | 4/2006 | Mizubata et al. | 271/3.14 |
| 2007/0109612 | A1 * | 5/2007 | Sakakibara et al. | 358/486 |
| 2008/0239415 | A1 * | 10/2008 | Nakamura et al. | 358/498 |
| 2008/0285093 | A1 * | 11/2008 | Sheng et al. | 358/474 |
| 2008/0291511 | A1 * | 11/2008 | Kuo et al. | 358/498 |

FOREIGN PATENT DOCUMENTS

| | | |
|---|---|---|
| JP | 7172618 | 7/1995 |
| JP | 2000-004315 | 1/2000 |
| JP | 2000-053276 | 2/2000 |

OTHER PUBLICATIONS

Jul. 20, 2010 Office Action issued in corresponding Japanese Application No. 2005-270259.

* cited by examiner

*Primary Examiner* — Stefanos Karmis
*Assistant Examiner* — Patrick Cicchino
(74) *Attorney, Agent, or Firm* — Banner & Witcoff, Ltd

(57) ABSTRACT

An image reader includes: a conveyance path forming member; a conveying unit; a reading unit; and a pressing unit. The conveyance path forming member forms a part of a conveyance path extending from a conveyance start position to a discharge position via an image reading position. The conveying unit is capable of conveying documents having different widths along the conveyance path. The reading unit reads the document at the reading position. The pressing unit extends in the document width direction, is disposed as opposed to the reading unit, and holds the document conveyed by the conveying unit in cooperation with the conveyance path forming member by pressing the document against the conveyance path forming member. The pressing unit is divided into a plurality of pressing members that are arranged in the document width direction and that press the documents against the conveyance path forming member independently from one another.

15 Claims, 7 Drawing Sheets

IMAGE READER

CROSS REFERENCE TO RELATED APPLICATION

This application claims priority from Japanese Patent Application No. 2005-270259 filed Sep. 16, 2005, the entire content of which is incorporated herein by reference.

TECHNICAL FIELD

The disclosure relates to an image reader for reading a document while conveying the document.

BACKGROUND

Conventionally, such image reader is provided with a document supporting unit so that the document may not float at an image reading position where an image is read, as disclosed in the U.S. Pat. No. 5,953,574.

In the image reader, the document supporting unit is formed of a follower roller which can press the document.

SUMMARY

It is considered that the follower roller can prevent floating of the document in the document width direction.

However, when the image reader is used, it is assumed that documents of various sizes (document widths) are read. Especially when a small document in width is read, a pressing force applied by the document supporting unit to the document becomes large, thereby tending to generate document jam.

To solve this problem, the pressing load may be reduced, or only a part of the document in the width direction may be pressed by a smaller document supporting unit in width In these cases, however, when a relatively large document in width is read, the pressing force applied to the document becomes small and thus, floating of the document cannot be completely prevented.

In view of the foregoing, it is an object of the invention to provide an image reader that can properly convey a document without allowing the document to float even if the document is a large document in width and without generating jam even if the document is a small document in width.

In order to attain the above and other objects, the invention provides an image reader including: a conveyance path forming member; a conveying unit; a reading unit; and a pressing unit. The conveyance path forming member forms a part of a conveyance path extending from a conveyance start position to a discharge position via an image reading position, a document width direction being defined substantially perpendicular to the conveyance path. The conveying unit is capable of conveying documents having different widths along the conveyance path. The reading unit reads the document at the reading position. The pressing unit extends in the document width direction, is disposed as opposed to the reading unit, and holds the document conveyed by the conveying unit in cooperation with the conveyance path forming member by pressing the document against the conveyance path forming member. The pressing unit is divided into a plurality of pressing members that are arranged in the document width direction and that press the documents against the conveyance path forming member independently from one another.

DETAILED DESCRIPTION

Figure 1:
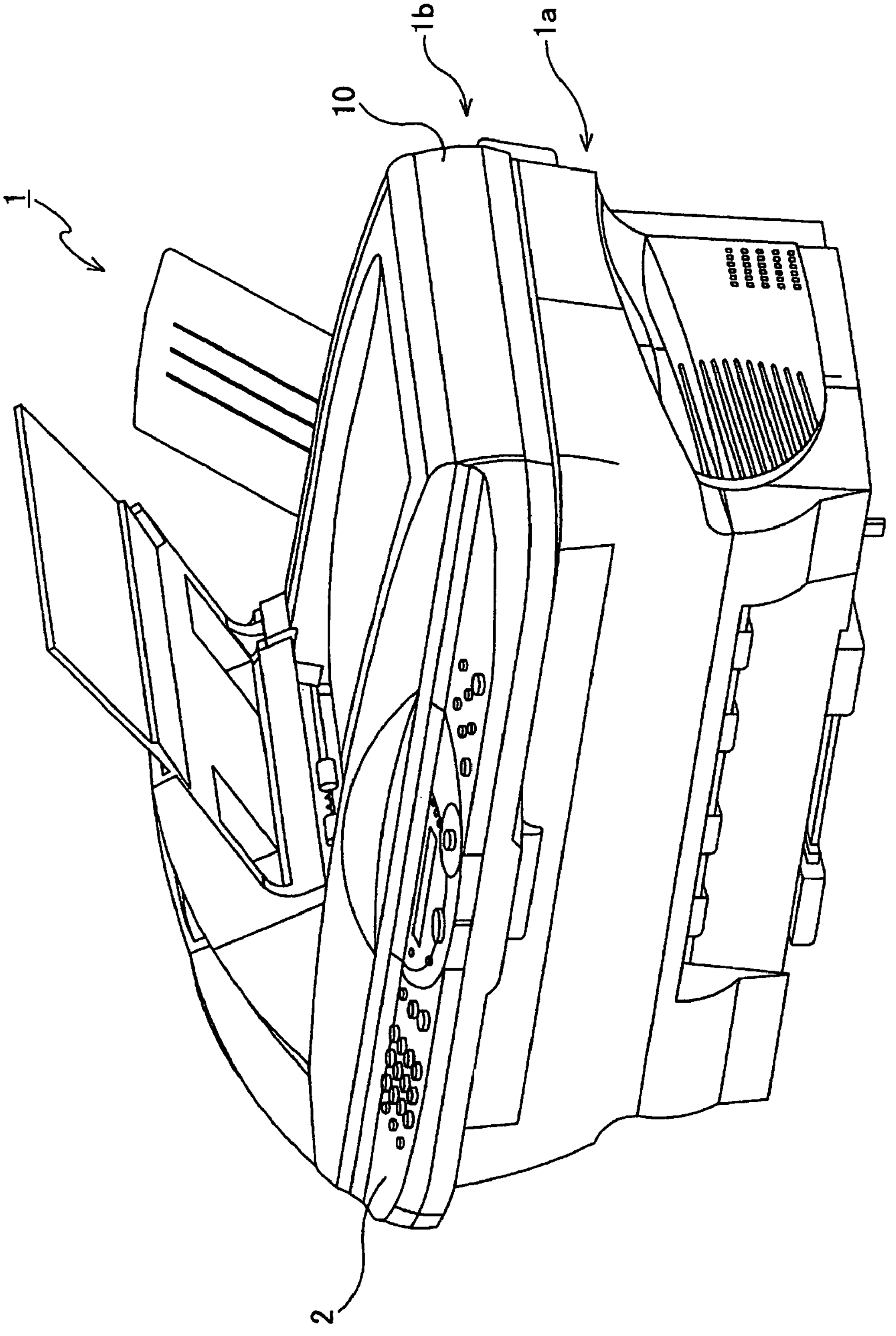
FIG. 1 is an outline view of a multifunction device into which an image reader according to a first embodiment of the invention is incorporated.

An image reader according to some aspects of the invention will be described while referring to the accompanying drawings wherein like parts and components are designated by the same reference numerals to avoid duplicating description.

First Embodiment

[Description of Overall Multifunction Device 1]

FIG. 1 is an outline view of a multifunction device in which an image reader 10 of a first embodiment is incorporated.

As shown in FIG. 1, the multifunction device 1 has a clamshell configuration in which an upper main unit 1*b* is openably attached to a lower main unit 1*a*. The upper main unit 1*b* includes the image reader 10. An operational panel 2 is formed on a front surface of the upper main unit 1*b*. Although the multifunction device 1 has a laser printer in addition to the image reader 10, since the laser printer is not directly related to the invention, description thereof is omitted.

[Description of Image Reader 10]

Figure 2:
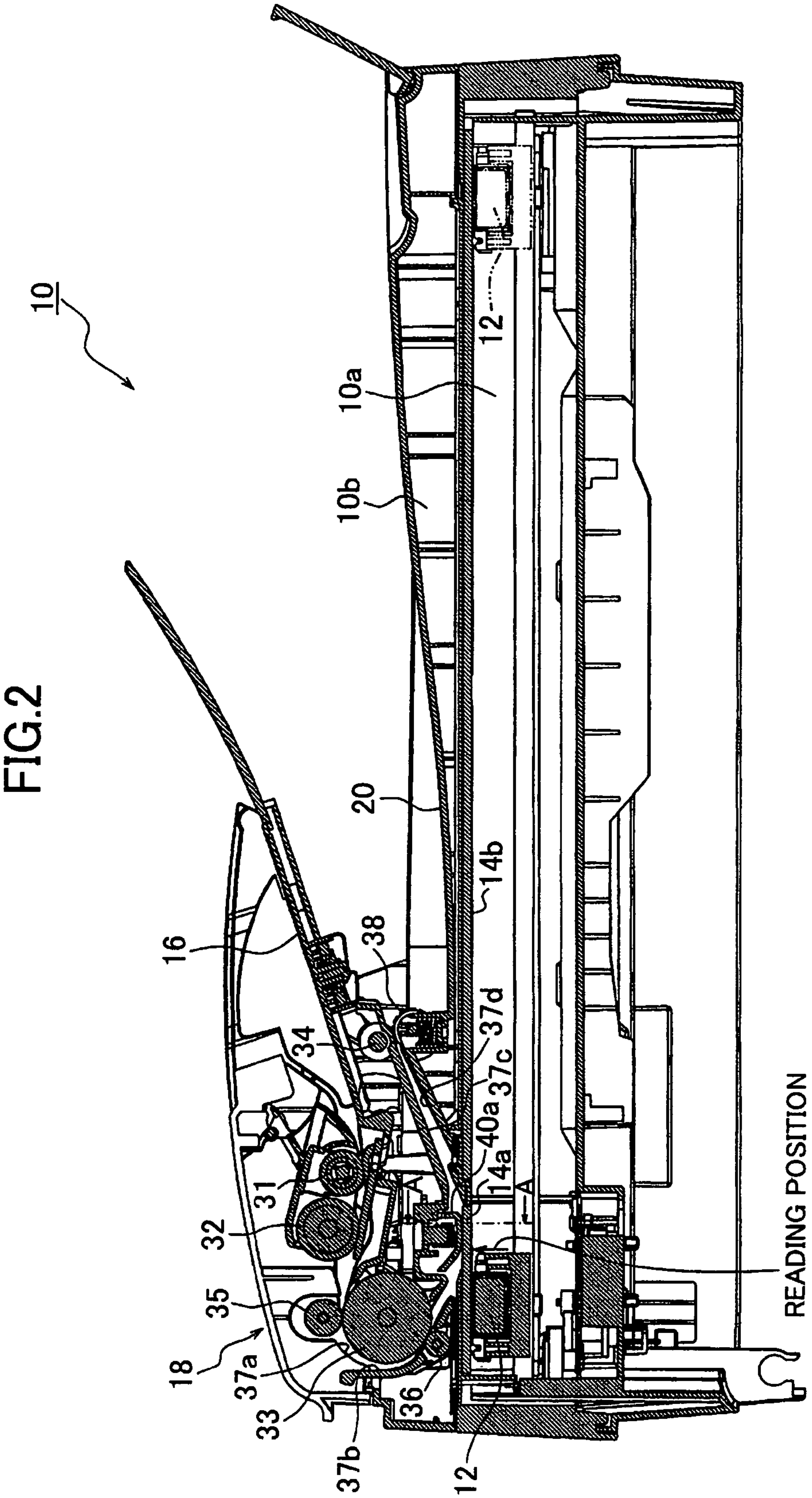
FIG. 2 is a side sectional view of the image reader.

FIG. 2 is a side sectional view of the image reader 10.

As shown in FIG. 2, the image reader 10 has a flat bed (FB) mechanism and an Automatic Document Feed (ADF) mechanism. The image reader 10 also has a clamshell configuration in which a cover unit 10*b* is openably attached to a flat bed unit 10*a*.

In the image reader 10, the flat bed unit 10*a* is provided with a contact image sensor 12, a first platen glass 14*a* and a second platen glass 14*b*. The cover unit 10*b* is provided with a document feeding tray 16, a document conveyor 18 and a document discharging tray 20.

The image sensor 12 has a light emitting unit (not shown) and a light receiving unit (photoelectric conversion element: not shown) and is configured so as to read an image by radiating light to a document on the first platen glass 14*a* or the second platen glass 14*b* by the light emitting unit and receiving light reflected from the document by the light receiving unit.

The image sensor 12 is driven by a driving mechanism (not shown) to move in the left-to-right direction in FIG. 2. When the document is actually read using the automatic document feed, the light receiving unit in the image sensor 12 moves to a position directly below a reading position (refer to FIG. 2).

The document conveyor 18 has a document feeding roller 32 for separating documents stacked on the document feeding tray 16 from one another and feeding the document one by one, a sucking roller 31 for guiding the document to the document feeding roller 32, a conveying roller 33 for conveying the document fed by the document feeding roller 32 along a conveyance path (a path formed by guiding members 37*a* to 37*d* and the first platen glass 14*a*) and a discharging roller 34 for discharging the document conveyed by the conveying roller 33 to the document discharging tray 20.

The document conveyor 18 has: free follower rollers 35, 36 which are disposed as opposed to the conveying roller 33 and which rotate following rotation of the conveying roller 33; and a free follower roller 38 which is disposed as opposed to the discharging roller 34 and which rotates following rotation of the discharging roller 34.

The document conveyor 18 has a pressing unit 40*a* located as opposed to the first platen glass 14*a*. The pressing unit 40*a* is disposed slightly downstream of the reading position in the document conveying direction (that is, the discharging roller 34 side) and prevents floating of the document at the reading position by holding the conveyed document between itself and the first platen glass 14*a*. The pressing unit 40*a* will be described later in detail.

[Description of Document Feeding Tray 16]

Figure 3A:
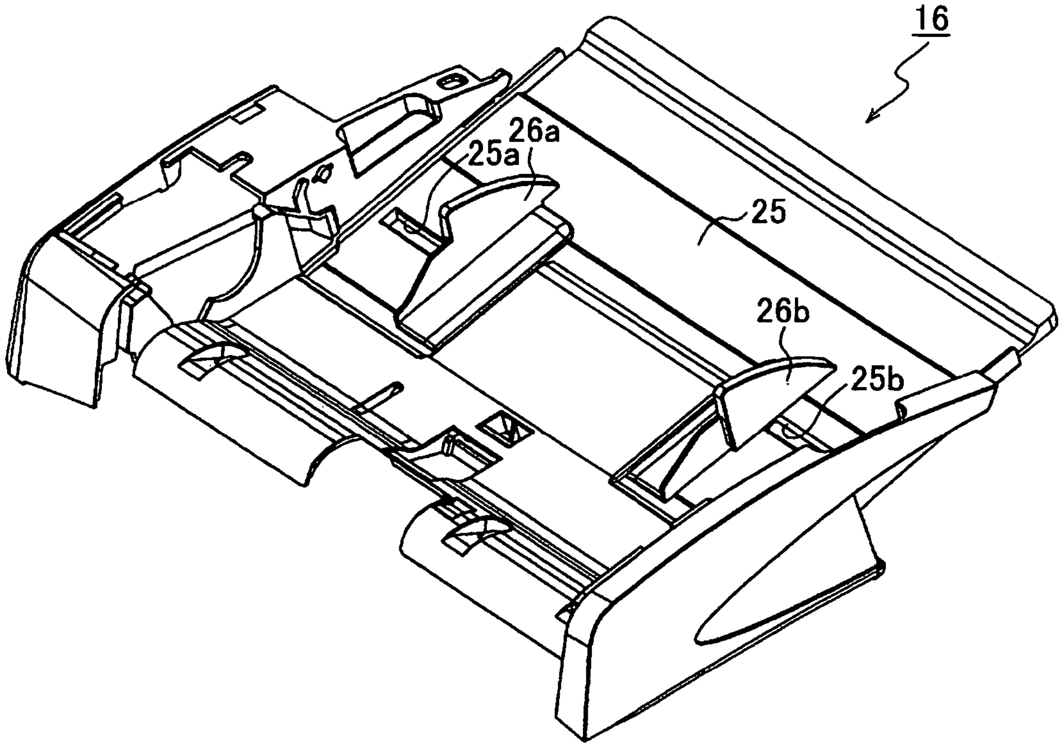
FIG. 3A is an outline view of a document feeding tray in a document guide closed state.
Figure 3B:
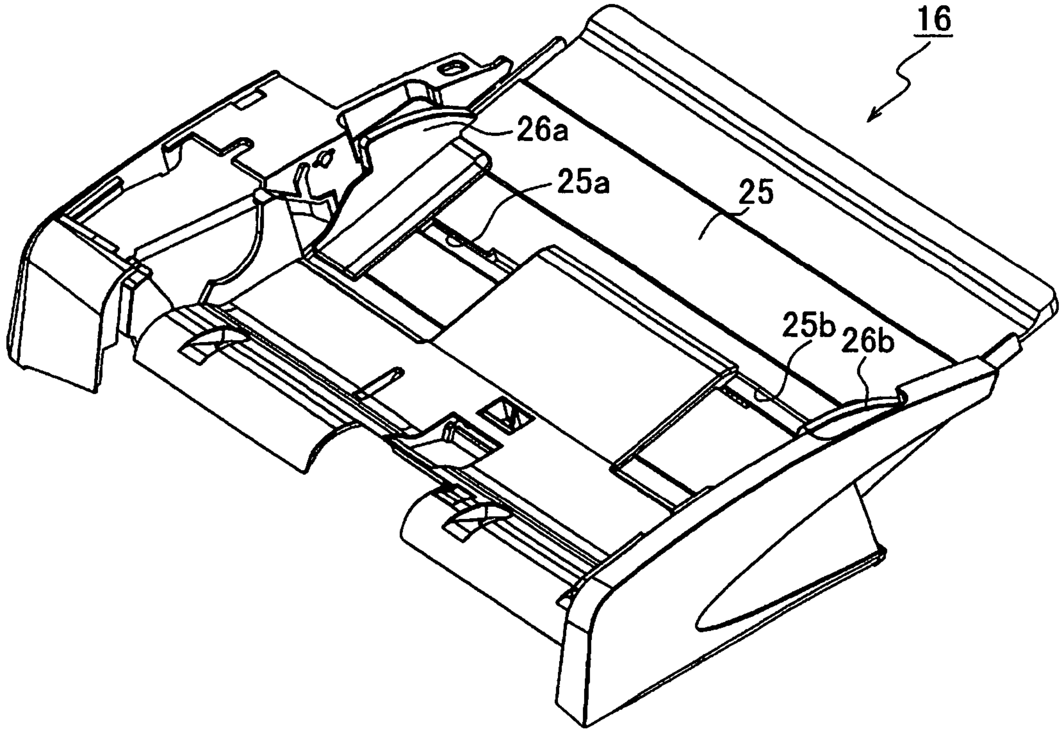
FIG. 3B is an outline view of the document feeding tray in a document guide opened state.

Next, the document feeding tray 16 will be described with reference to FIG. 3A and FIG. 3B. FIG. 3A and FIG. 3B are outline views of the document feeding tray 16. FIG. 3A is an outline view of the document feeding tray 16 in a document guide closed state and FIG. 3B is an outline view of the document feeding tray 16 in a document guide opened state.

As shown in FIG. 3A, the document feeding tray 16 has a mounting unit 25 for mounting the documents in the stacked state thereon and two document guides 26*a*, 26*b* disposed on the mounting unit 25.

On the mounting unit 25, grooves 25*a*, 25*b* for moving the document guides 26*a*, 26*b* are formed to extend in the document width direction that is perpendicular to both of the document conveying direction and the document thickness direction. The document guides 26*a*, 26*b* can move along the grooves 25*a*, 25*b*, respectively. The document guides 26*a*, 26*b* are connected to a link mechanism (not shown) so that when one of the document guides 26*a*, 26*b* moves along the corresponding groove, the other of the document guides 26*a*, 26*b* also moves following the movement to maintain a distance between the center of the document in the width direction and the document guide 26*a* to be equal to a distance between the center of the document in the width direction and the document guide 26*b*.

In this way, in the document feeding tray 16, the document guides 26*a*, 26*b* can be shifted between its closed state shown in FIG. 3A, in which the distance between the document guides 26*a*, 26*b* is the smallest to hold a small document in width, and its opened state shown in FIG. 3B, in which the distance between the document guides 26*a*, 26*b* is the largest to hold a large document in width.

Figure 6A:
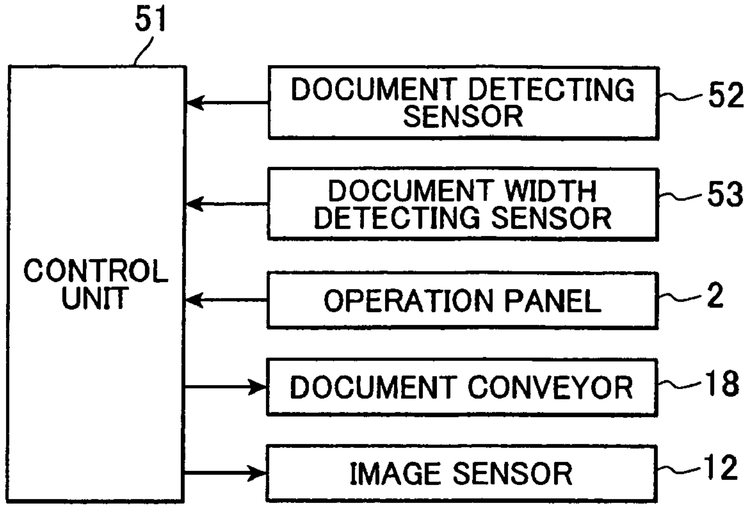
FIG. 6A is a block diagram showing electrical connection in the components of the image reader.

As shown in FIG. 6A, the document feeding tray 16 further has: a document detecting sensor 52 for detecting whether or not the document exists on the document feeding tray 16; and a document width detecting sensor 53 for detecting document width by detecting positions of the document guides 26*a*, 26*b*.

Well known sensors can be used as the document detecting sensor 52 and the document width detecting sensor 53. Representative examples of the document detecting sensor 52 include: a mechanical sensor which detects presence or absence of the document by judging whether or not a lever is fallen by the document; and an optical sensor which detects presence or absence of the document by emitting light and judging whether or not light reflected from the document is received. A representative example of the document width detecting sensor 53 includes a position sensor, such as an optical sensor, which detects positions of the document guides 26*a*, 26*b*.

[Description of Pressing Unit 40*a*]

Next, the pressing unit 40*a* will be described more in detail with reference to FIG. 4 and FIG. 5.

Figure 4:
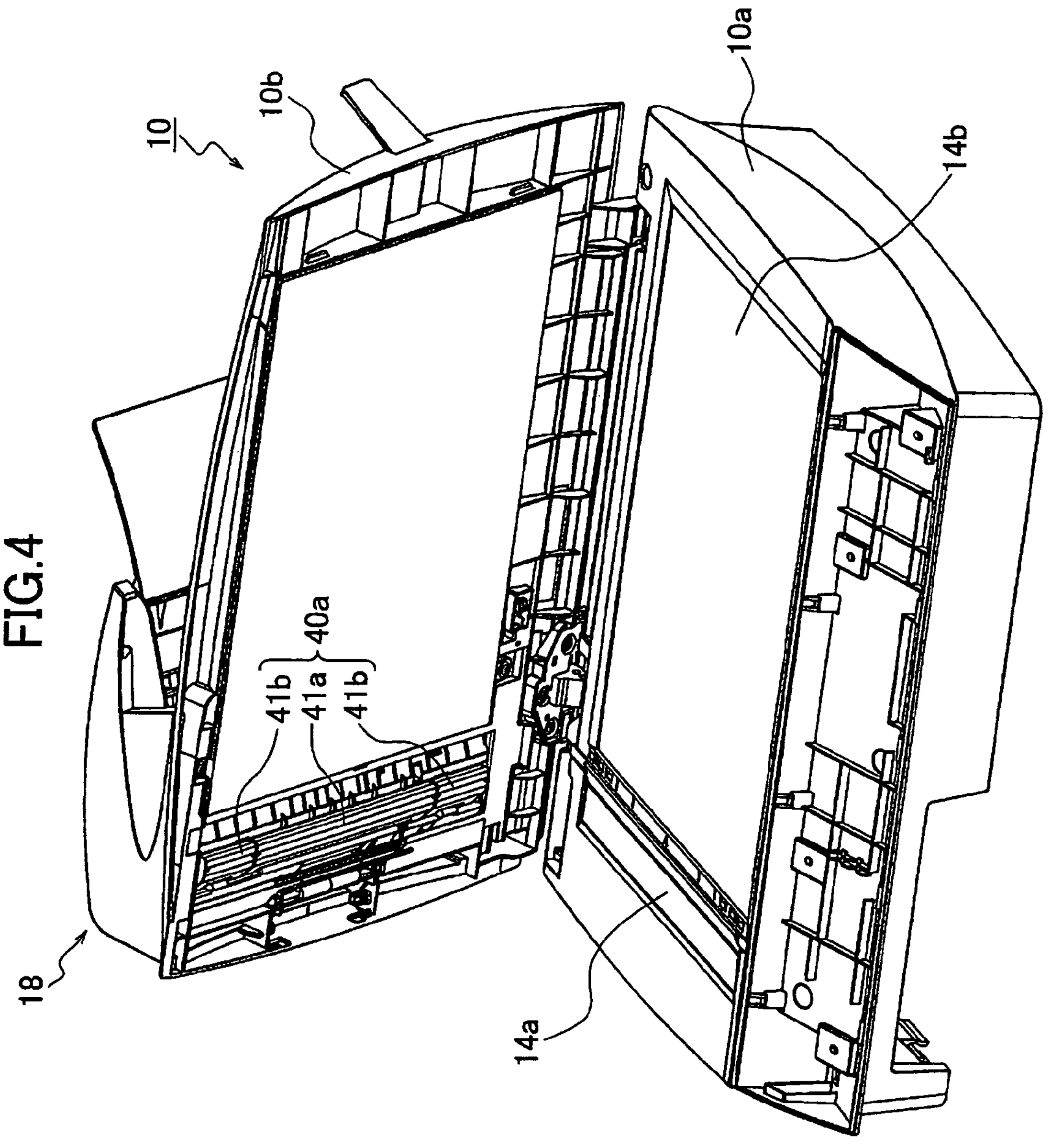
FIG. 4 is an outline view of the image reader in the state where a cover unit is opened.

FIG. 4 is an outline view of the image reader 10 in the state where the cover unit 10*b* is open. FIG. 5 is a side sectional view showing the image reader 10 cut in the document width direction, that is, a sectional view taken along a line A-A in FIG. 2. From FIG. 4, the operation panel 2 is omitted.

As shown in FIG. 4, the pressing unit 40*a* has a central pressing member 41*a* located at the center of the pressing unit 40*a* in the width direction and a pair of edge pressing members 41*b* located at a pair of opposite sides of the central pressing member 41*a* in the width direction. The central pressing member 41*a* and the edge pressing members 41*b* are configured from separate members, and therefore can press the document against the first platen glass 14*a* independently from one another.

The pressing members 41*a*, 41*b* extend in the document width direction and are arranged in the document width direction with no gaps therebetween. So, the pressing members 41*a*, 41*b* can cooperate with one another to press the whole document onto the first platen glass 14*a* in the document width direction with no gaps being formed therebetween.

It is noted that the pressing members 41*a*, 41*b* may be arranged in the document width direction with gaps being formed therebetween if the gaps are so small that the pressing members 41*a*, 41*b* can press the whole document onto the first platen glass 14*a* in the document width direction while successfully preventing the document from floating from the first platen glass 14*a*.

The pressing members 41*a*, 41*b* are arranged so as to be symmetrical about the center of the document in the width direction. In this manner, the pressing unit 40*a* is divided into the three members 41*a*, 41*b*, and 41*b* in the document width direction.

The pressing members 41*a*, 41*b* press the document in the vicinity of the reading position where the image sensor 12 reads images from the original (refer to FIG. 2). The reason why the pressing members press the document "in the vicinity of the reading position", not "the position corresponding to the reading position" is that the risk of scratching the reading position of the first platen glass 14*a* with the pressing members is avoided. That is, if the reading position of the first platen glass 14*a* is scratched, a read image may be disturbed. To prevent this, the pressing members 41*a* and 41*b* press the document "in the vicinity of the image reading position".

Figure 5:
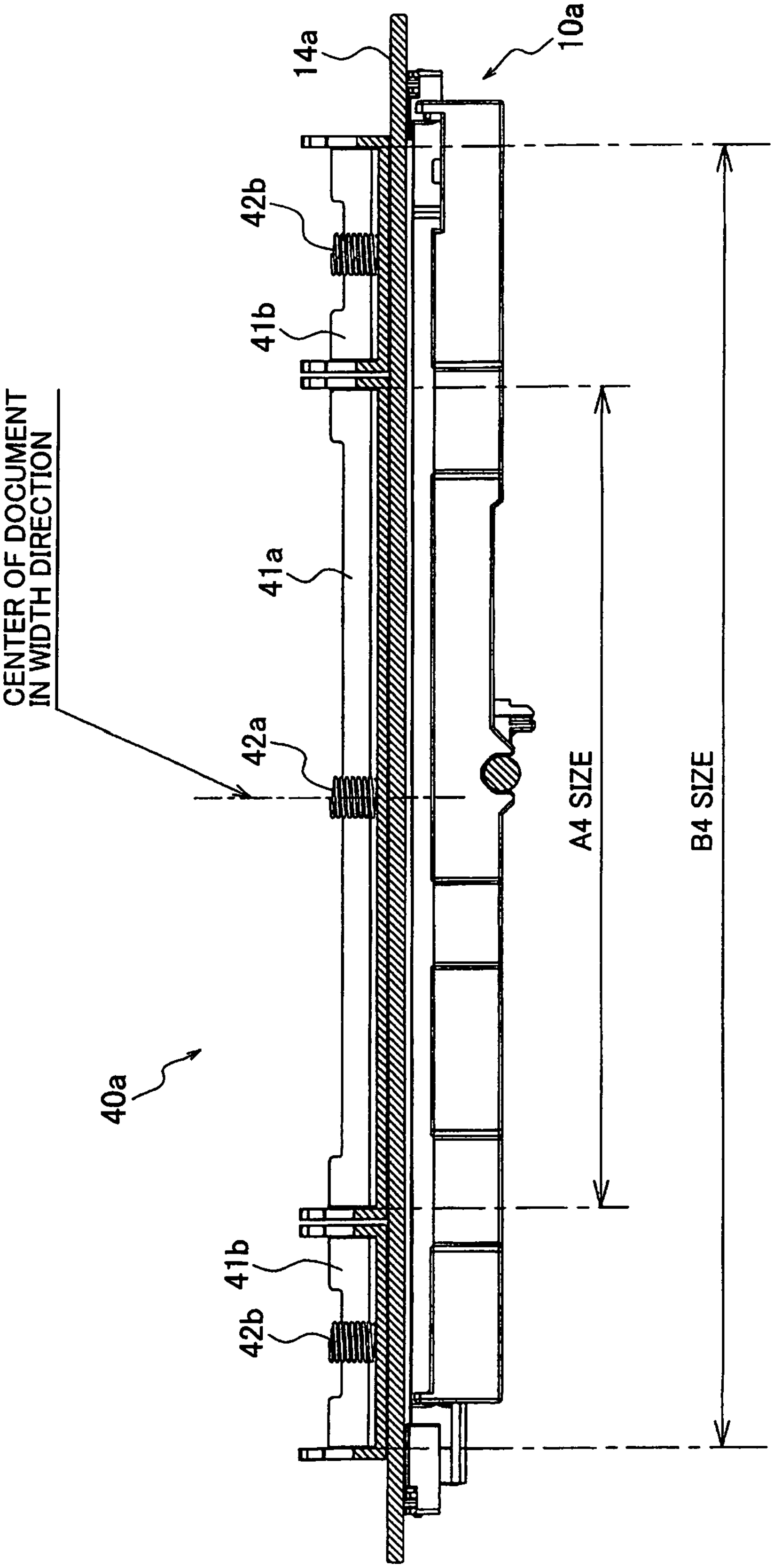
FIG. 5 is a side sectional view of the image reader taken along a line A-A in FIG. 2, that is, cut in the document width direction.

The pressing members 41*a*, 41*b* are urged against the first platen glass 14*a* by the elastic members 42*a*, 42*b*, such as springs, respectively, as shown in FIG. 5.

A length of the central pressing member 41*a* in the document width direction is set equal to or a slightly longer than an A4 size, which is the size of documents that are frequently used in the image reader 10. By setting the length of the central pressing member 41*a* slightly longer than the document size, it is ensured that the document can be properly pressed by the central pressing member 41*a* even when the document conveyed by the document conveyor 18 is slightly inclined or displaced.

A length of each edge pressing member 41*b* in the document width direction is set so that the sum of the lengths of the central pressing member 41*a* and of the two edge pressing members 41b is equal to or slightly longer than a B4 size, for example, that is greater than the A4 size.

In order to apply a uniform amount of pressing force to the entire width of the document, the amount of the urging force of the elastic member 42a is set dependently on the length of the pressing member 41a, and the amount of the urging force of the elastic member 42b is set dependently on the length of the pressing member 41b. That is, the amounts of the urging forces of the elastic members 42a and 42b are set so that a ratio of the amount of the urging force of the elastic member 42a relative to the amount of the urging force of the elastic member 42b is equal to a ratio of the length of the pressing member 41a in the document width direction relative to the length of the pressing member 41b in the document width direction.

Because the length of the central pressing member 41a in the document width direction and the length of each edge pressing member 41b in the document width direction are different from each other in this example, different amounts of urging forces are set for the elastic member 42a and the elastic members 42b.

Thus, when the document of A4 size is conveyed, the document is pressed toward the first platen glass 14a only by the central pressing member 41a. Since the document is not pressed by the edge pressing members 41b, an excessive pressing force is not applied to the document.

On the other hand, when the document of B4 size is conveyed, the document is properly pressed by the central pressing member 41a and the edge pressing members 41b so as not to float. Since the document of B4 size is pressed by all of the central pressing member 41a and the edge pressing members 41b, a load exerted on the document is larger as compared with the case of conveying the document of A4 size. Since the document of B4 size is longer than the document of A4 size in the document width direction, the pressing force applied to both the documents on a unit length in their width direction is almost the same.

[Description of Control System]

Next, a control system in the image reader 10 will be described with reference to FIG. 6A. FIG. 6A is a block diagram showing electrical connection of the components in the image reader 10.

As shown in FIG. 6A, the image reader 10 has a control unit 51 which includes a CPU, a ROM and a RAM (not shown) and is configured as a well known microcomputer.

In this control system, the control unit 51 is electrically connected to the document detecting sensor 52, the document width detecting sensor 53, the operation panel 2, the document conveyor 18 including a motor (not shown) for driving various rollers or the like, and the image sensor 12.

On the basis of commands input via the operation panel 2 and detection signals from the various sensors 52, 53, the control unit 51 drives the document conveyor 18, the image sensor 12 and the like to allow the document conveyor 18, the image sensor 12 to perform processing of conveying the document and processing of reading the document.

[Description of Image Reading Processing]

Processing of reading the document mounted on the mounting unit 25 while conveying the document will be described with reference to FIG. 6B.

Figure 6B:
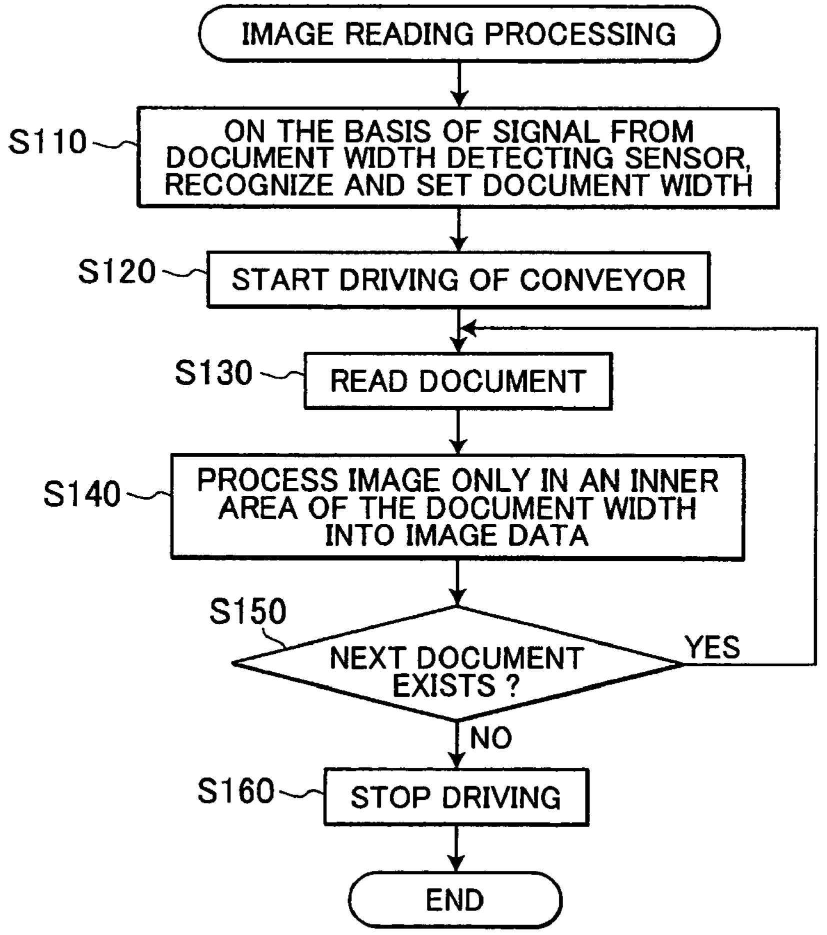
FIG. 6B is a flow chart showing an image reading processing of the image reader.

FIG. 6B is a flow chart showing image reading processing executed by the control unit 51.

The image reading processing is started when a command to start reading of the document is issued via the operation panel 2 in the state where the document detecting sensor 52 detects the document.

First, on the basis of a signal from the document width detecting sensor 53, document width is recognized and the value of width is set in the control unit 51 (for example, RAM) in S110.

Then, driving of the document conveyor 18 is started in S120.

Subsequently, by using the image sensor 12, the document is read at the reading position in S130.

On the basis of the document width value set in the control unit 51, a region with the set document width is defined as an effective region where the document exists. So, an image detected only in an inner part of the effective region having the set document width is processed into image data in S140.

Then, it is determined in S150 whether or not the next document exists by judging whether or not the document detecting sensor 52 detects some document. When the document detecting sensor 52 detects some document (Yes in S150), the processing in S130 and the subsequent steps is repeated.

On the other hand, when the document detecting sensor 52 detects no document (No in S150), driving of the document conveyor 18 is stopped in S160, and image reading processing is finished.

As described above, the multifunction device 1 has: the document conveyor 18 which can convey the documents having different widths in the conveyance path extending from the conveyance start position (mounting unit 25) to the discharge position (document discharging tray 20) via the reading position; and the image sensor 12 which reads the document at the reading position. The multifunction device 1 further has the pressing unit 40a. The pressing unit 40a extends in the document width direction. The pressing unit 40a is disposed in the vicinity of the reading position as opposed to the image sensor 12. The pressing unit 40a holds the document conveyed by the document conveyor 18 in cooperation with the first platen glass 14a, which forms a part of the conveyance path, by pressing the document against the first platen glass 14a due to the urging forces of the elastic members 42a, 42b and due to its own weight The pressing unit 40a is divided into the plurality of members 41a and 41b in the document width direction so that the plurality of members 41a and 41b can press the document against the first platen glass 14a independently from one another.

Because the pressing unit 40a is divided into the plurality of members 41a and 41b, when a small document in width is conveyed, the pressing force applied to the document can be reduced. Thus, it is possible to prevent paper jam caused by applying an excessive pressing force to the document.

Since the pressing unit 40a is formed to extend in the document width direction, floating of the document at the reading position can be prevented.

Furthermore, the central pressing member 41a and the edge pressing members 41b are pressed against the first platen glass 14a by the elastic members 42a, 42b, respectively.

Because the central pressing member 41a and the edge pressing members 41b in the pressing unit 40a are provided with the elastic members 42a, 42b, respectively, the pressing unit 40a can be disposed in such an orientation that the pressing unit 40a presses the document upward from below against a gravitational force. That is, the pressing unit 40a can satisfactorily press the document regardless of the direction in which the pressing unit 40a presses the document. Thus, limitation on arrangement of the pressing unit 40a can be eliminated.

The pressing unit 40a is divided into the plurality of members 41a and 41b at positions corresponding to the sheet width of standard sheet size. Thus, the pressing force of the pressing unit 40*a* can be adjusted according to the size of the frequently-used standard sheets (A4 in the above description). Even when the size of the document is changed, an appropriate pressing force can be applied to the document according to the document width.

Furthermore, the multifunction device 1 has the document width detecting sensor 53 for detecting width of the document conveyed by the document conveyor 18. On the basis of the document width detected by the document width detecting sensor 53, the control unit 51 sets the document reading width representing the width of the effective region where an image should be read by the image sensor 12. The image sensor 12 reads the document using the thus set document reading width indicative of the effective region to read.

Accordingly, it is possible to eliminate the possibility that a seam or gap between the adjacent pressing members 41*a*, 41*b* is captured as an image by reading an unnecessary area where the document does not exist. Appearance of the read document can be prevented from depredating.

Moreover, the multifunction device 1 has the document guides 26*a*, 26*b* which are disposed at the mounting unit 25 and which can move in the document width direction symmetrically about the center of the document in the width direction by abutting against a pair of opposite side edges of the document. The pressing unit 40*a* is divided into the pressing members 41*a* and 41*b* symmetrically about the center of the document in the width direction.

Accordingly, irrespective of the document width, the center position of the document at the time of passing the pressing unit 40*a* can be made unchanged. So, it is ensured that a pressing force appropriate to the document width can be applied to the document.

More specifically, since the center of the document can be properly positioned by the document guides 26*a*, 26*b*, irrespective of the document width, it is ensured that when the document passes the pressing unit 40*a*, the center of the document passes the center of the pressing unit 40*a*. As a result, the pressing unit 40*a* can press the document uniformly in the width direction, thereby effectively preventing inclination and jam of the document.

Second Embodiment

Next, a multifunction device in a second embodiment will be described.

In this second embodiment, only differences from the multifunction device 1 in the first embodiment will be described in detail. Same or like components to the multifunction device 1 in the first embodiment are given to the same numerals and description thereof is omitted.

[Description of Document Guides 26*a*, 26*b*]

According to the preset embodiment, the document guide 26*a* is fixed at a position in the document guide opened state shown in FIG. 3B. Only the document guide 26*b* can move according to the document width.

That is, in the first embodiment, both of the document guides 26*a*, 26*b* can move to locate the center of the document in the width direction at a fixed position for all the documents with different widths. Contrarily, according to the present embodiment, the document guide 26*a* is fixed at a predetermined position for all the documents with different widths.

Since such mechanism is well known, description thereof is omitted.

[Description of Pressing Unit 40*b*]

Figure 7:
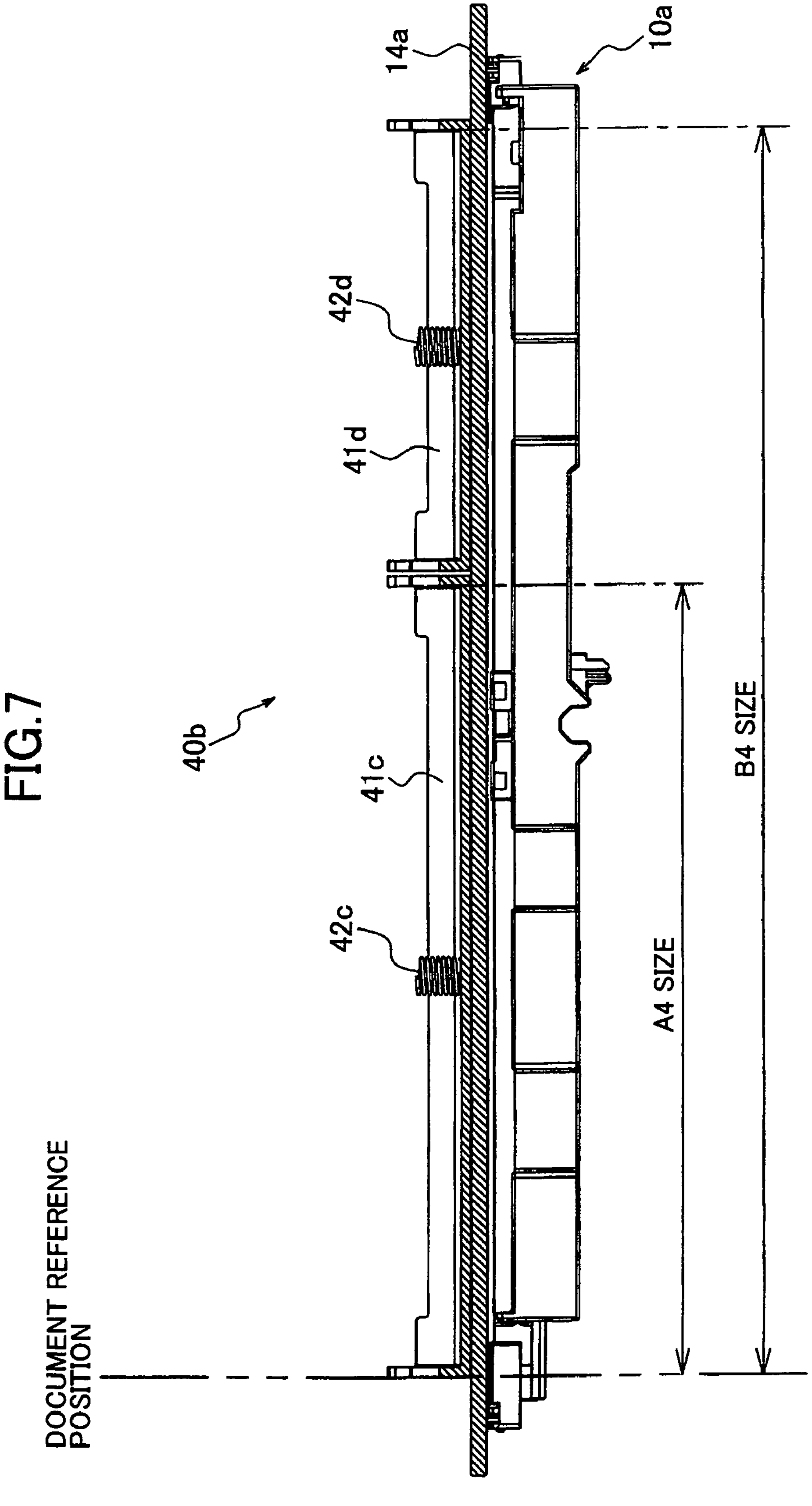
FIG. 7 is a side sectional view showing an image reader in a second embodiment cut in the document width direction and corresponds to FIG. 5.

According to the present embodiment, a pressing unit 40*b* shown in FIG. 7 is employed instead of the pressing unit 40*a*.

FIG. 7 is a side sectional view showing the image reader 10 cut in the document width direction (sectional view taken along a line A-A in FIG. 2).

As shown in FIG. 7, the pressing unit 40*b* has a reference position side pressing member 41*c* disposed on a document reference position side (that is, the fixed document guide 26*a* side) and an auxiliary pressing member 41*d* arranged next to the reference position side pressing member 41*c* in the document width direction.

Like the pressing members 41*a*, 41*b* in the first embodiment, the pressing members 41*c* and 41*d* are configured from separate members, and therefore can press the document against the first platen glass 14*a* independently from one another.

The pressing members 41*c*, 41*d* extend in the document width direction and are arranged in the document width direction with no gaps therebetween. Thus, the pressing members 41*c*, 41*d* extend in the document width direction and can cooperate with one another to press the whole document in the width direction against the first platen glass 14*a* without any gap.

It is noted that the pressing members 41*c*, 41*d* may be arranged in the document width direction with gaps being formed therebetween if the gaps are so small that the pressing members 41*c*, 41*d* can press the whole document onto the first platen glass 14*a* in the document width direction while successfully preventing the document from floating from the first platen glass 14*a*.

The pressing members 41*c*, 41*d* are urged against the first platen glass 14*a* by elastic members 42*c*, 42*d*, such as springs, respectively.

A length of the reference position side pressing member 41*c* in the document width direction is set equal to or slightly longer than the size of frequently-used documents or sheets (A4, for example).

A length of the auxiliary pressing member 41*d* in the document width direction is set so that the sum of the lengths of the reference position side pressing member 41*c* and of the auxiliary pressing member 41*d* is equal to or slightly longer than a B4 size, for example, that is greater than the A4 size.

Similarly to the first embodiment, the amount of the urging force of the elastic member 42*c* is set dependently on the length of the pressing member 41*c* in the document width direction, and the amount of the urging force of the elastic member 42*d* is set dependently on the length of the pressing member 41*d* in the document width direction. That is, the amounts of the urging forces of the elastic members 42*c* and 42*d* are set so that a ratio of the amount of the urging force of the elastic member 42*c* relative to the amount of the urging force of the elastic member 42*d* is equal to a ratio of the length of the pressing member 41*c* in the document width direction relative to the length of the pressing member 41*d* in the document width direction.

According to the present embodiment, one of a pair of opposite side edges of the document in the width direction is set as a fixed reference position. The document guide 26*b* can move relative to the fixed reference position in the document width direction. The pressing unit 40*b* is divided into the pressing members 41*c* and 41*d* in the document width direction with reference to the fixed reference position.

Thus, position of the document at the time of passing the pressing unit 40*b* (position of the one side edge of the document) can be made unchanged irrespective of the document width. It is ensured that a pressing force appropriate to the document width can be applied to the document.

More specifically, since the one side edge of the document can be properly positioned by the document guides 26*a*, 26*b*, irrespective of the document width, it is ensured that when the document passes the pressing unit 40*b*, the one side edge of the document passes the one side edge of the reference position side pressing member 41*c*. As a result, the pressing unit 40*b* can press the document uniformly in the width direction, thereby effectively preventing inclination and jam of the document.

While the invention has been described in detail with reference to the above aspects thereof, it would be apparent to those skilled in the art that various changes and modifications may be made therein without departing from the spirit of the invention.

For example, in the above description, the lengths of the pressing members 41*a* and 41*c* are set equal to or slightly greater than the length of the A4 size since the A4 size is considered as a frequently-used sheet size. However, if sizes other than the A4 size is considered as the frequently-used sheet size, the lengths of the pressing members 41*a* and 41*c* may be set equal to or slightly greater than the length of the thus considered frequently-used sheets. For example, if it is assumed that a standard sheet size of B5 is frequently used in the image reader 10, the lengths of the pressing members 41*a* and 41*c* may be set equal to or slightly greater than the length of the sheet size B5.

In the above-mentioned embodiments, the pressing units 40*a* and 40*b* are divided into the pressing members 41*a* and 41*b* and 41*c* and 41*d* dependently on the standard sheet sizes of A4 and B4. However, the pressing units 40*a*, 40*b* may be divided into the pressing members 41*a*-41*d* dependently on other standard sheet sizes, such as postcard and overhead projector sheets.

Furthermore, in the above-described embodiments, although the pressing units 40*a*, 40*b* each are divided into two or three members, each pressing unit may be divided into four or more sections to address a lot of different document sizes. In the case where the document guides 26*a*, 26*b* are configured to move about the center of the document in the width direction, it is preferred that the pressing members are disposed to be symmetrical about the center of the document in the width direction and the number of the pressing members, into which the pressing unit is divided, is an odd number. Since the document can be pressed uniformly in the width direction, inclination and jam of the document can be prevented.

The pressing units 40*a*, 40*b* need not have the elastic members 42*a* to 42*d*. The document may be pressed only due to the weights of the pressing units 40*a*, 40*b*.

In the above-described embodiments, the pressing unit 40*a* and 40*b* are disposed in the vicinity of the reading position as opposed to the image sensor 12. However, the pressing unit 40*a* and 40*b* may be disposed at the reading position as opposed to the image sensor 12.

What is claimed is:

1. An image reader comprising:

a conveyance path forming member forming a part of a conveyance path extending from a conveyance start position to a discharge position via an image reading position, a document width direction being defined substantially perpendicular to the conveyance path;

a conveying unit configured to convey documents having different widths along the conveyance path;

a reading unit configured to read a document at the reading position, including a platen glass; and a pressing unit which extends in the document width direction, which is disposed as opposed to the reading unit, and which holds the document conveyed by the conveying unit in cooperation with the conveyance path forming member by pressing the document against the conveyance path forming member, the pressing unit being divided into a plurality of pressing members that are arranged in the document width direction and that are configured to press the document against the conveyance path forming member independently from one another and are configured to contact the platen glass when the document is not between the pressing unit and the platen glass, each pressing member having a length in the document width direction, the length of at least one pressing member being different from the length of another pressing member.

2. The image reader as stated in claim 1, wherein the pressing unit is disposed at the image reading position.

3. The image reader as stated in claim 1, wherein the pressing unit is disposed in the vicinity of the image reading position.

4. The image reader as stated in claim 1, wherein each pressing member is configured to press the document against the conveyance path forming member due to weight of the each pressing member.

5. The image reader as stated in claim 1, further comprising an urging unit pressing the plurality of pressing members against the conveyance path forming member.

6. The image reader as stated in claim 5, wherein the urging unit includes a plurality of urging members in one to one correspondence with the plurality to pressing members, each urging member pressing the corresponding pressing member against the conveyance path forming member.

7. The image reader as stated in claim 6, wherein each urging member presses the corresponding pressing member against the conveyance path forming member with an urging force whose amount is determined in proportion to the length of the corresponding pressing member in the document width direction.

8. The image reader as stated in claim 1, further comprising:

a document width detecting unit that detects width of the document conveyed by the conveying unit; and a reading width setting unit that sets a document reading width, representing width of an effective region from which an image should be read by the reading unit, on the basis of the document width detected by the document width detecting unit, wherein the reading unit reads an image from the document on the basis of the document reading width set by the reading width setting unit.

9. The image reader as stated in claim 1, wherein a fixed reference position is defined on the conveyance path in the document width direction;

wherein the image reader further comprises a positioning unit that is configured to position the document with respect to the fixed reference position in the width direction, the document having a width in the document width direction;

wherein the conveying unit is configured to convey, along the conveyance path, the document that is positioned by the positioning unit; and wherein the plurality of pressing members is located in the document width direction at positions that are defined with respect to the fixed reference position, to allow at least one of the pressing members, which is selected from among the plurality of pressing members based on the fixed reference position and on the width of the document, to hold the document conveyed by the conveying unit in cooperation on the conveyance path forming member by pressing the document against the conveyance path forming member.

10. The image reader as stated in claim 9, wherein the positioning unit comprises:

a pair of guiding members which is disposed at the conveyance start position and at least one of which is configured to move in the width direction with respect to the fixed reference position while abutting against at least one side end of the document.

11. The image reader as stated in claim 10, wherein the pair of guiding members are configured to symmetrically move in the width direction about the center of the document in the width direction while abutting against a pair of opposite side ends of the document, wherein the pressing unit is divided into three or more pressing members that are arranged symmetrically about the center of the document in the width direction.

12. The image reader as stated in claim 11, wherein the pressing unit is divided into three pressing members including a first pressing member that has a first length in the document width direction and a pair of two second pressing members that is arranged on a pair of opposite sides of the first pressing member in the document width direction and that have second lengths in the document width direction, respectively, the first length being greater than or equal to a first predetermined sheet size, a total of the first length and a second multiple of the second length being greater than or equal to a second predetermined sheet size greater than the first predetermined sheet size.

13. The image reader as stated in claim 10, wherein the pair of guiding members include:

a first guiding member which is disposed at the conveyance start position and which sets one side edge of the document at the fixed reference position by abutting against the one side edge of the document; and a second guiding member which is disposed at the conveyance start position and which is configured to move in the width direction relative to the fixed reference position while abutting against the other side edge of the document, wherein the pressing unit is divided into the plurality of pressing members whose positions are determined with reference to the fixed reference position.

14. The image reader as stated in claim 13, wherein the pressing unit is divided into two pressing members including a first pressing member that extends from the fixed reference position by a first length in the document width direction and a second pressing member that is arranged next to the first pressing member and that has a second length in the document width direction, the first length being greater than or equal to a first predetermined sheet size, a total of the first length and the second length being greater than or equal to a second predetermined sheet size greater than the first predetermined sheet size.

15. The image reader as stated in claim 10, further comprising:

a document width detecting unit that detects a width of the document conveyed by the conveying unit by detecting a position of the guiding member that is configured to move in the width direction while abutting against the corresponding side end of the document; and a reading width setting unit that sets a document reading width, representing a width of an effective region from which an image should be read by the reading unit, on the basis of the document width detected by the document width detecting unit, wherein the reading unit reads an image from the document on the basis of the document reading width set by the reading width setting unit.

* * * * *